United States Patent
Goel et al.

(10) Patent No.: US 11,429,378 B1
(45) Date of Patent: Aug. 30, 2022

(54) CHANGE ESTIMATION IN VERSION CONTROL SYSTEM

(71) Applicant: Microsoft Technology Licensing, LLC, Redmond, WA (US)

(72) Inventors: Hardik Goel, Seattle, WA (US); Arno Mihm, Sammamish, WA (US); Dragos Boia, Seattle, WA (US); Jacek Andrzej Czerwonka, Sammamish, WA (US); Maksim Shmelev, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/316,468

(22) Filed: May 10, 2021

(51) Int. Cl.
   *G06F 8/71* (2018.01)
(52) U.S. Cl.
   CPC ...................................... *G06F 8/71* (2013.01)
(58) Field of Classification Search
   CPC ......................................................... G06F 8/71
   USPC .......................................................... 717/122
   See application file for complete search history.

(56) References Cited

U.S. PATENT DOCUMENTS

| | | | |
|---|---|---|---|
| 2008/0301639 A1* | 12/2008 | Bell ........................... | G06F 8/71 717/120 |
| 2010/0106705 A1* | 4/2010 | Rush ......................... | G06F 8/36 707/723 |
| 2016/0253373 A1* | 9/2016 | Fryc ........................... | G06F 8/65 707/695 |
| 2019/0155599 A1* | 5/2019 | Goldstein ................. | G06F 8/71 |

OTHER PUBLICATIONS

"microsoft / PullRequestQuantifier", Retrieved from: https://github.com/microsoft/PullRequestQuantifier/issues, Retrieved Date: Mar. 4, 2021, 3 Pages.
"Smartbear", Retrieved from: Retrieved from: https://web.archive.org/web/20201214230146/https://smartbear.com/learn/code-review/best-practices-for-peer-code-review/, Dec. 14, 2020, 3 Pages.
Boia, Dragosd., "Beta", Retrieved from: https://github.com/microsoft/PullRequestQuantifier/releases/tag/1.0.0, Jan. 5, 2021, 1 Page.
Boia, et al., "Pull Request Quantifier", Retrieved from: https://github.com/microsoft/PullRequestQuantifier, Jan. 5, 2021, 7 Pages.
Goel, Hardik, "Add github client probot based #6", Retrieved from: https://github.com/microsoft/PullRequestQuantifier/pull/6, Jan. 1, 2021, 3 Pages.

* cited by examiner

*Primary Examiner* — John Q Chavis
(74) *Attorney, Agent, or Firm* — Workman Nydegger

(57) ABSTRACT

The estimation and visualization of a degree of change between a further edited state of code and a selected version of the code. For each of some counted added or deleted portions (e.g., code lines) of code, the system estimates that the added (or deleted) portion complies with a non-review characteristic. The added (or deleted) code lines that comply with a non-review characteristic are excluded from the estimation of the degree of change. Thus, the estimation excludes consideration of added or deleted portions that need no substantial review, while considering more substantial added or deleted portions in the estimations. The estimation is then visualize giving the developer or the reviewer a better idea of the scale of changes that has really been made since the selected version of the code.

20 Claims, 4 Drawing Sheets

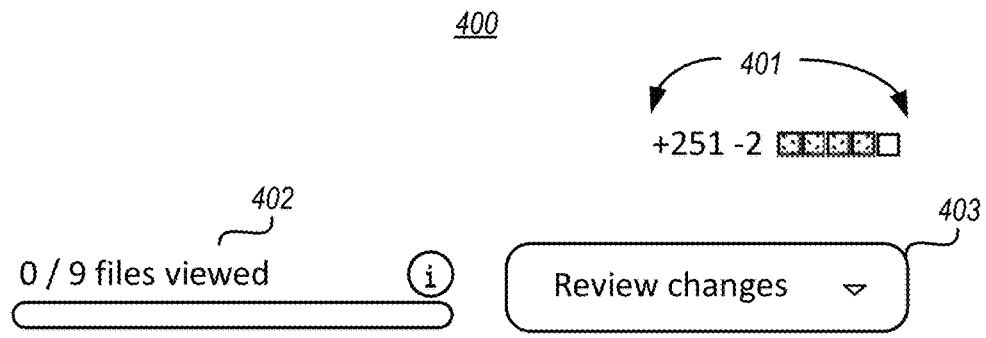
FIG. 4
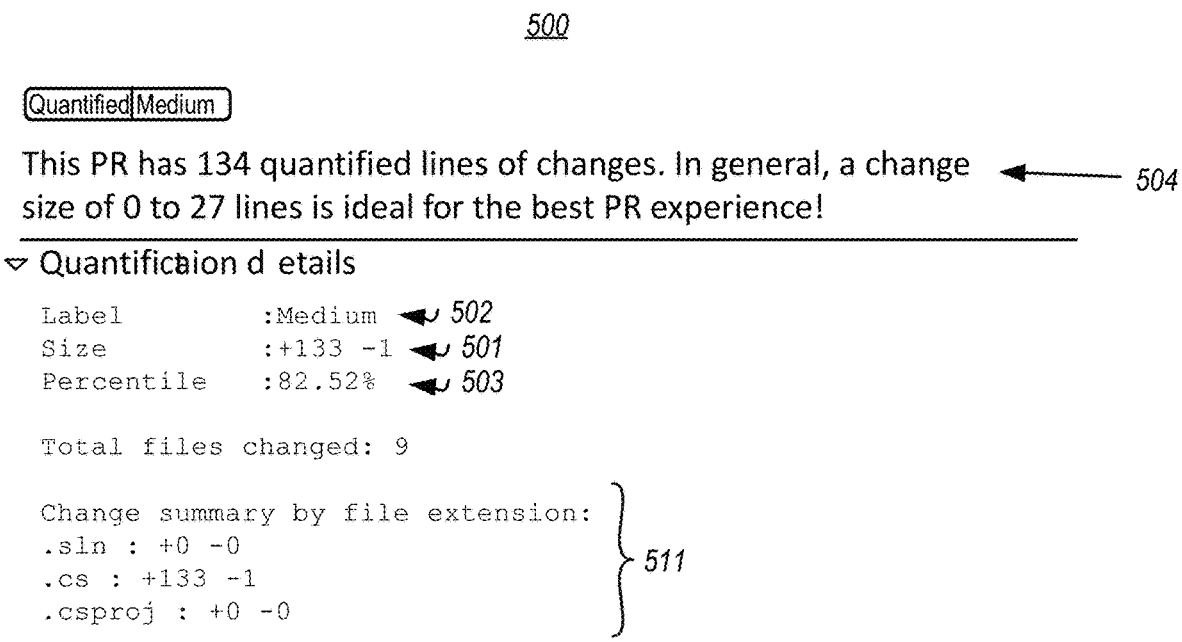
FIG. 5
600
PrQuantified:Small|Diff: +67 -1 (Formula Sum) | Percentiles: +26.8% -0.4% (27.2%)
Source: Pull Request Quantifier (Extension)     More Info   Close
FIG. 6

CHANGE ESTIMATION IN VERSION CONTROL SYSTEM

BACKGROUND

Computing systems operate in response to the execution of a computer program, which is a collection of computer-executable instructions or "code". A program is initially drafted in text using a source code language, after which the program is compiled or interpreted into machine-readable instructions. A program can often be enormously complex and require teamwork from a large team of developers.

Distributed version control systems (such as GIT and AZURE DevOps) allow multiple developers to work on the same project, allowing for the creation of new versions of code, each representing a node in a tree. The tree includes a master branch that represents the main movement of the project from one version to the next. However, developers can also work on independent assignments in secondary branches. That is, the individual developer can begin their individual assignment working from one of the versions in the master branch, and then creating new versions that do not impact the master branch.

When that developer has completed their individual assignment, the developer can submit a pull request whereby other developers can review the changes made in the secondary branch, and then merge the changes into the master branch if all looks well. Existing solutions use visual emphasis to show code lines added (e.g., in green highlighting) and code lines deleted (e.g., in red highlighting), allowing a reviewer to easily see the changes proposed.

The number of changes made in a secondary branch can vary in size, depending on the nature of the individual assignment. Conventional version control systems notify the reviewer of the scale of the change in terms of numbers of code lines added, and number of code lines deleted.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the estimation and visualization of a degree of change between a further edited state of code and a selected version of the code. This occurs in an environment in which a version control system permits each of multiple versions of code under development to be selected by a developer, and allows the developer to make further edits from that selected version. The version control system counts added portions (and potentially deleted portions) reflected in a further edited state of the code as compared to the selected version of the code. For example, the version control system might count how many code lines have been added and deleted between a selected version of the code and the further edited state of the code.

For each of one or more added portions counted by the version control system, the system estimates that the added portion complies with a non-review characteristic. The added code lines that comply with a non-review characteristic are excluded from the estimation of the degree of change. Potentially also, for each of one or more deleted portions counted by the version control system, the system estimates that the deleted portion complies with a non-review characteristic. The deleted code lines that comply with a deletion non-review characteristic are excluded from the estimation of the degree of change. Thus, the estimation excludes consideration of added or deleted portions that need no substantial review, while considering more substantial added or deleted portions in the estimations. As an example, the estimation may be or consider added lines of code that are not blank lines, comment lines, or lines of code that are automatically added by the system and thus not as prone to error.

The estimation is then visualized giving the developer or the reviewer a better idea of the scale of change that has really been made since the selected version of the code. This could prompt a developer to more judiciously submit appropriate smaller changes that thus promotes more versions of code under development. This, in turn, allows more flexibility in later navigating those versions. This also may prevent a reviewer from being overwhelmed with having to review overly complex changes, thereby more likely allowing the reviewer to properly review the change, and thereby improve the collaborative process of generating code.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 4 illustrates a user interface that may be provided to a reviewer who is deciding whether or not to merge the further edited state of a secondary branch into the master branch of the code under development;

FIG. 5 illustrates a user interface that visualizes the very same change of FIG. 4, except with adjusted line counts shown, and with degrees of change and contextual percentages shown;

FIG. 6 illustrates an example user interface that may be integrated within (either natively or as an add-in) a source code or text editor, thereby presenting change estimations to a developer who is making the change.

DETAILED DESCRIPTION

The principles described herein relate to the estimation and visualization of a degree of change between a further edited state of code and a selected version of the code. This occurs in an environment in which a version control system permits each of multiple versions of code under development to be selected by a developer, and allows the developer to make further edits from that selected version. The version control system counts added portions (and potentially deleted portions) reflected in a further edited state of the code as compared to the selected version of the code. For example, the version control system might count how many code lines have been added and deleted between a selected version of the code and the further edited state of the code.

For each of one or more added portions counted by the version control system, the system estimates that the added portion complies with a non-review characteristic (also referred to as an "addition non-review characteristic"). The added code lines that comply with a non-review characteristic are excluded from the estimation of the degree of change. Potentially also, for each of one or more deleted portions counted by the version control system, the system estimates that the deleted portion complies with a non-review characteristic (also referred to as a "deletion non-review characteristic"). The deleted code lines that comply with a deletion non-review characteristic are excluded from the estimation of the degree of change. Thus, the estimation excludes consideration of added or deleted portions that need no substantial review, while considering more substantial added or deleted portions in the estimations. As an example, the estimation may be or consider added lines of code that are not blank lines, comment lines, or lines of code that are automatically added by the system and thus not as prone to error.

The estimation is then visualized giving the developer or the reviewer a better idea of the scale of change that has really been made since the selected version of the code. This could prompt a developer to more judiciously submit appropriate smaller changes that thus promotes more versions of code under development. This, in turn, allows more flexibility in later navigating those versions. This also may prevent a reviewer from being overwhelmed with having to review overly complex changes, thereby more likely allowing the reviewer to properly review the change, and thereby improve the collaborative process of generating code.

Figure 1:
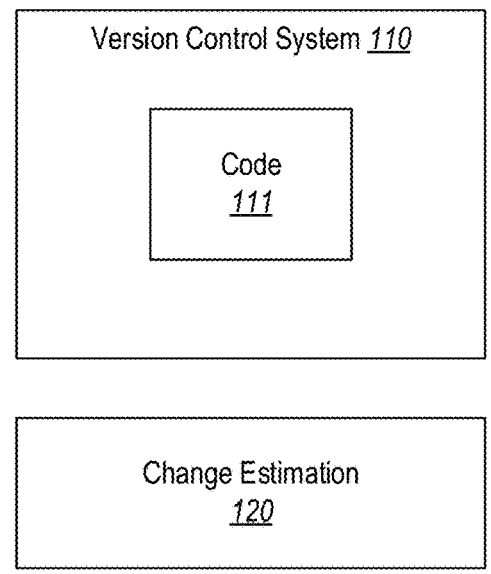
FIG. 1 illustrates an environment in which the principles described herein may operate, which includes a version control system that permits each of multiple versions of code under development to be selected by a developer, and a change estimation component that estimates a scale of change between a selected version of the code and a further edited state of the code.

FIG. 1 illustrates an environment 100 in which the principles described herein may operate. The environment 100 includes a version control system 110 that permits each of multiple versions of code 111 under development to be selected by a developer. Each version of the code 111 is created by one or more developers choosing to commit the state of the code as a new version.

Using the version control system 110, the developer can select a particular version of the code 111 in order to simply view that version of the code. Alternatively, the developer can also opt to navigate to a prior version of the code and establish a new branch of versions for individual assignments that are not quite ready to be incorporated into the master branch of versions. A discussion of FIG. 2 will help clarify this principle.

Figure 2:
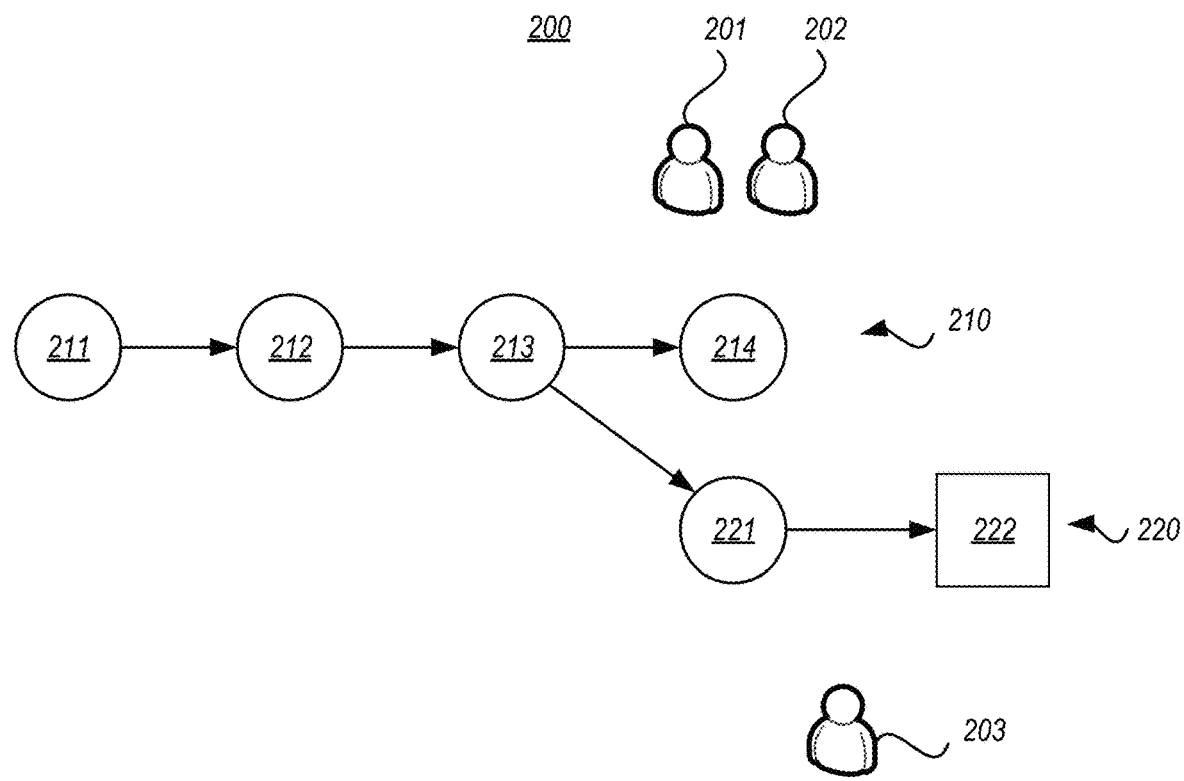
FIG. 2 illustrates an example of multiple versions of the code under development, represented as a tree of circular nodes in which each node represents a version of the code, and which includes a master branch representing the main development of the code, and a secondary branch representing an individual project.

FIG. 2 illustrates an example of multiple versions of the code 111, which is represented as a tree 200 of circular nodes in which each node represents a version of the code 111. In this example, there are three developers 201, 202 and 203 that are collaborating to create the code 111. There is a master branch in which the nodes represent progress of the code 111 as accepted by the entire team of developers. Thus, the master branch represents collaborated progress of the code. In this particular example, there is a master branch 210 that represents a sequence of four versions of the code including the first version 211, the second version 212, the third version 213, and the fourth version 214. The developers 201, 202 and 203 may have collaborated towards the progress of the code in the master branch 210.

The tree can also have any number of secondary branches in which individual developers can make edits to the code without immediate impact to the master branch. For example, the tree 200 shows a secondary branch 220 that is being worked on by the developer 203. This secondary branch 220 stems from the third version 213 in the master branch 210. However, the developer 203 added a further version 221, as well as the further edited state 222. The further edited state 222 is represented as a square to represent that the developer 203 has not yet committed the state 222 as a new version. To create this secondary branch 220, the developer 203 navigated to the third version 213 in the master branch, created a new branch, continued editing until the developer committed the version 221 into the secondary branch, and thereafter continued editing to arrive at uncommitted state 222 that is not yet formally a version in the secondary branch.

If the developer 203 was ready to merge the secondary branch 220 with the master branch 210, the developer would issue a request to the other developers 201 and 202, also called herein reviewers 201 and 202, to review the changes the developer 203 made in the secondary branch 220. After appropriate review and possible further changes by the reviewers 201 and 202, the merge may be approved resulting in a new version (not shown) of the code being added to the master branch 210.

Returning to FIG. 1, the environment 100 also includes a change estimation component 120 that is configured to estimate a degree of change between the further edited state of the code and a selected version of the code. If the change estimation is being provided to the developer 203, the change estimation component 120 operates so as to cause the estimation to be displayed to the developer 203. If the change estimation is being provided to a reviewer (e.g., reviewer 201), the change estimation component 120 operates so as to cause the estimation to be displayed to that reviewer. The change estimation component 120 may be structured as described below for the executable component 706 of FIG. 7.

As an example, the developer 203 may be offered an estimation of the differences between the further edited state 222 of the code and the immediate prior version 221 of the code 111, which would give the developer 203 some idea on whether it is time to create another version of the code in the secondary branch 221. As a second example, the developer 203 may be offered an estimation of the differences between the further edited state 222 of the code and the third version 213 so that the developer 203 is given some idea of how much change has been made in the secondary branch 220. In these two examples, the change estimation component 120 may operate on a developer computing system belonging to the developer 203, or even if not, would cause the estimation to be displayed on the developer computing system.

As a final example, the developer 203 may be offered an estimation of the differences between the further edited state 222 of the code and the fourth version 214, so as to give some idea to the developer 203 how much change the reviewers 201 and 202 would have to review in order to merge the secondary branch 220 with the master branch 210. In this case, again, the change estimation component 120 would operate on a developer computing system 120, or even if not, would cause the estimation to be displayed on the developer computing system belonging to the developer 203. The same estimation may be provided to the reviewers 201 and 202 should the developer 203 choose to request to merge the secondary branch 220 with the master branch 210. In that case, the change estimation component 120 would operate on reviewer computing systems belonging to respective reviewers 201 and 202, or even if not, would cause the estimation to be displayed on the respective reviewer computing system.

The version control system 110 is capable of counting the number of portions added between a prior selected version of the code and a further edited state of the code. For example, the version control system 110 may count the number of added portions, and the number of deleted portions. As an example, the version control system 110 may be configured to count at a granularity of a line of code. Thus, the version control system 110 can be used to count the number of code lines added, and the number of code lines deleted, since a prior version of the code.

However, in accordance with the principles described herein, an estimation of the change is made that takes into consideration added portions and deleted portions that do not require significant review, such as blank lines added or deleted, comment lines added or deleted, code lines added as a result of system automation, added code lines that replace deleted code lines that were syntactically or functionally identical, code lines that are created by a strict splitting of a prior code line, a code line that is created by a strict combination of prior code lines, and so forth. Such changes simply do not require substantive review. The estimation may also exclude consideration of code portions having user-specified characteristics.

Thus, the principles described herein provide better guidance to a developer on whether or not to commit the current state of the code into a new version, or whether or not to merge the secondary branch with the master branch. The principles described herein also provides reviewers with a more accurate indication of the amount of review that would truly be needed, and allows the reviewer to exclude from this estimation code portions that are not of interest to the reviewer according to user-specified characteristics.

Figure 3:
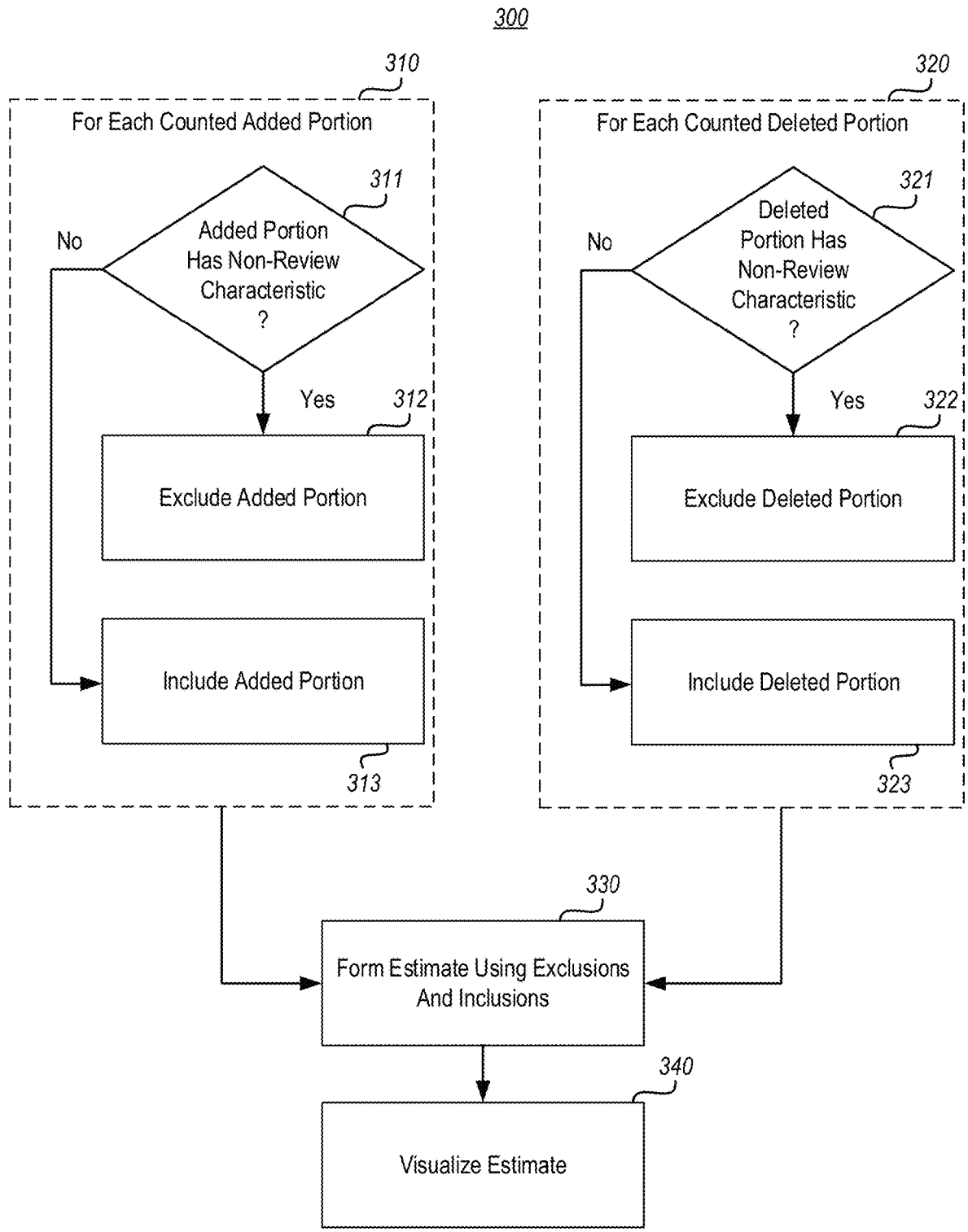
FIG. 3 illustrates a flowchart of a method for estimating a degree of change between the further edited state of the code and the selected version of the code, in accordance with the principles described herein.

FIG. 3 illustrates a flowchart of a method 300 for estimating a degree of change between the further edited state of the code and the selected version of the code, in accordance with the principles described herein. In the example of FIG. 2, the further edited state of the code is represented by state 222. The selected version of the code that this state is compared against could be the version 221, the version 213, or the version 214. The changes compared to each of the versions could be helpful in different contexts, as mentioned above.

As an example, the method 300 may be performed by the change estimation component 120 of FIG. 1. For instance, the change estimation component 120 may be instantiated or operate to perform the method 300 in response to one or more processors (processors 702) of a computing system (e.g., computing system 700) executing computer-readable instructions that are structured so as to cause the method 300 to be performed. As previously mentioned, an example of counted portions and deleted portions are the code lines added and deleted as counted by the version control system.

For each of all or at least some of the deleted portion counted by the version control system comparing the current state of the code to the selected version of the code, the method 300 includes performing the content of dashed-lined box 310. Specifically, the method includes determining whether the added portion has a non-review characteristic (decision block 311). Where there may be any one of multiple non-review characteristics indicative of an added code portion not requiring real review, this determination is rather whether the added portion has one or more non-review characteristics of a collection of potential addition non-review characteristics. If the added portion has an addition non-review characteristic ("Yes" in decision block 311), the added portion is excluded from consideration in the estimate (act 312). If the added portion does not have any addition non-review characteristic ("No" in decision block 311), the added portion is included in the consideration of the estimate (act 313).

Similarly, for each of all or at least some of the deleted portions counted by the version control system comparing the current state of the code to the selected version of the code, the method 300 includes performing the content of dashed-lined box 320. Specifically, the method includes determining whether the deleted portion has a deletion non-review characteristic (decision block 321). Where there may be any one of multiple deletion non-review characteristics indicative of a deleted code portion not requiring real review, this determination is rather whether the deleted portion has one or more deletion non-review characteristics of a collection of potential deletion non-review characteristics. If the deleted portion has a deletion non-review characteristic ("Yes" in decision block 321), the deleted portion is excluded from consideration in the estimate (act 322). If the deleted portion does not have any deletion non-review characteristic ("No" in decision block 321), the deleted portion is included in the consideration of the estimate (act 323).

In determining whether an added or deleted portion complies with a non-review characteristic, the portion is interpreted in view of the semantics of the source code language being used. For instance, comment lines are specified differently in different source code languages. Thus, the determinations 311 and 321 are made by evaluating the added and deleted portions using the semantics of their source code languages.

The change estimation component then forms an estimation (act 330) of the changes made by excluding the added and deleted portions that are to be excluded from consideration (the portions excluded in acts 312 and 322), and including the added and deleted portions that are included in the consideration (the portions included in acts 313 and 323). As an example, when the version control system counts additions and deletions on the granularity of a code line, example non-review characteristics for an added code line could include that the added code line is a blank line, a comment line, an automatically added code line, and so forth. If the code line satisfies any one of the non-review characteristics, it is not considered in estimating the degree of change.

While in some cases a non-review characteristic may be the same for added portions and deleted portions, there is no requirement that the collection of addition non-review characteristics be the same as the collection of deletion non-review characteristics. As an example, the characteristic of a code line being a blank line may be a non-review characteristic for both addition and deletion, since neither the addition nor deletion of a blank line requires any substantive review. On the other hand, even if a code line was automatically added and thus excluded from consideration in a prior change, if that automatically added code line is manually deleted by a developer, that deletion might well be properly reviewed since the developer has manually edited well-formed automatic code.

The change estimation component then causes a visualization of the estimated degree of change to be displayed in association with the further edited state of the code (act 340). Example estimations and visualizations will be described with respect to FIGS. 5 and 6. But first, FIG. 4 will be described, which illustrates a conventional visualization quantifying changes made.

FIG. 4 illustrates a user interface 400 that may be provided to a reviewer who is deciding whether or not to merge the further edited state of a secondary branch into the master branch. Referring to FIG. 2, for example, the user interface 400 may be presented to the reviewer 201 who is deciding whether or not to merge the further edited state 222 of the secondary branch 220 into the master branch 210. For instance, the user interface 400 may quantify changes made in the further edited state 222 as compared to the latest version 214 in the master branch 210. The visualization is based on the version control system counting added portions on a granularity of a line of code, and counting deleted portions on a granularity of a line of code.

A line count visualization 401 illustrates a strict count of lines added (here 252 code lines), and lines deleted (here 2 code lines). Conventionally, this count includes a count of all code lines, including those that really do not require any review at all. Accordingly, the visualization 401 may give a distorted sense of the scale of what the reviewer needs to do. In some cases, the system may automatically add thousands of lines in response to a developer manually inputting a few lines of code. The strict count of lines would show that there are thousands of lines added in the change, when really it is just the few lines manually added by the developer that really should be reviewed. The user interface also includes a files viewed visualization 402 which shows the reviewer how many of the added, deleted, or modified files they have reviewed thus far, and a review changes control 403 that allows the reviewer to actually enter into the filed to review changes, and potentially make corrections, prior to merging the edited state 222 into the master branch 210.

The principles described herein give a much more accurate estimate of the scale of the changes made since a selected version. As an example, FIG. 5 illustrates a user interface 500 that visualizes the very same change. Here, the line count visualization 501 for the same change visualized in the user interface 400 shows only 133 code lines added, and 1 code line deleted. The line counts are adjusted to exclude added code lines that do not invoke any need for review, such as added or deleted blank lines, added or deleted comment lines, or code lines that were automatically added by the system.

In addition, the code lines may exclude code lines that satisfy user-specified characteristics. As an example, in FIG. 5, perhaps the reviewer indicated that files with extensions of type .sln and .csproj are not to be reviewed by that reviewer. Thus, added code lines or deleted code lines within files with those extensions are not included within that count. In the example of FIG. 5, for example, the file extension visualization 511 shows no added or deleted lines associated with any files of extensions .sln and .csproj. This may be because the user indicated no desire to review those types of files.

The user interface also illustrates a size context portion 502, and a percentile context portion 503. The size context portion 502 labels the size of the change (here "Medium") based on the adjusted line code in the line count visualization 501. Here, a change involving the addition of 133 substantive code lines and the deletion of 1 substantive code line is characterized as a medium change. The percentile context portion 503 gives a percentile rating of the change taking into consideration a sampling of changes from a group of developers (e.g., the developer team). In this case, the percentile context portion shows the change at an 82.52%, well over the median change size for that team. This percentile is determined based on the adjusted line count, rather than the strict line count. Thus, the automatic addition of a large file having thousands of lines of code, none of which requiring review, would not affect the percentile, and thus would better reflect the true relative scale of the change for that team. The suggestion line 504 gives the reviewer a sense of what sized change the team usually has to review.

As previously mentioned, the estimation may also be presented to the developer that is making the changes. For example, in FIG. 2, the developer 203 may be presented with an estimate of the amount of changes made between any selected version 213, 221 or 214. FIG. 6 illustrates an example user interface 600 that may be integrated within (either natively or as an add-in) for a source code or text editor. This user interface also shows adjusted line counts, and percentages. Thus, a new developer can quickly know whether the scale of their change is becoming too large for the team, and may prompt the developer to provide changes in smaller and more manageable increments.

Here, the version control system is described as counting additions and deletions on the granularity of a line of code. However, the principles described herein may also apply if that granularity was at some other level, such as a word, or character. However, conventionally version control systems currently count changes on the granularity of a line.

Accordingly, the principles described herein provide a helpful mechanism for estimating and visualizing a scale of change made between a selected version of code and a further edited state of the code. The estimated scale of change more accurately reflects the real changes that should be reviewed, rather than being based on all of the changes. This allows developers and reviewers to more accurately eyeball the amount of non-negligible changes that have been made and that are to be reviewed. This prevents pull requests that involve overly burdensome review, which typically result in fewer corrections being made by the reviewer, and potentially leave undone some corrections that should be made. Thus, the principles described herein enable more collaborated, comprehensive, and efficient development of high-quality code.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
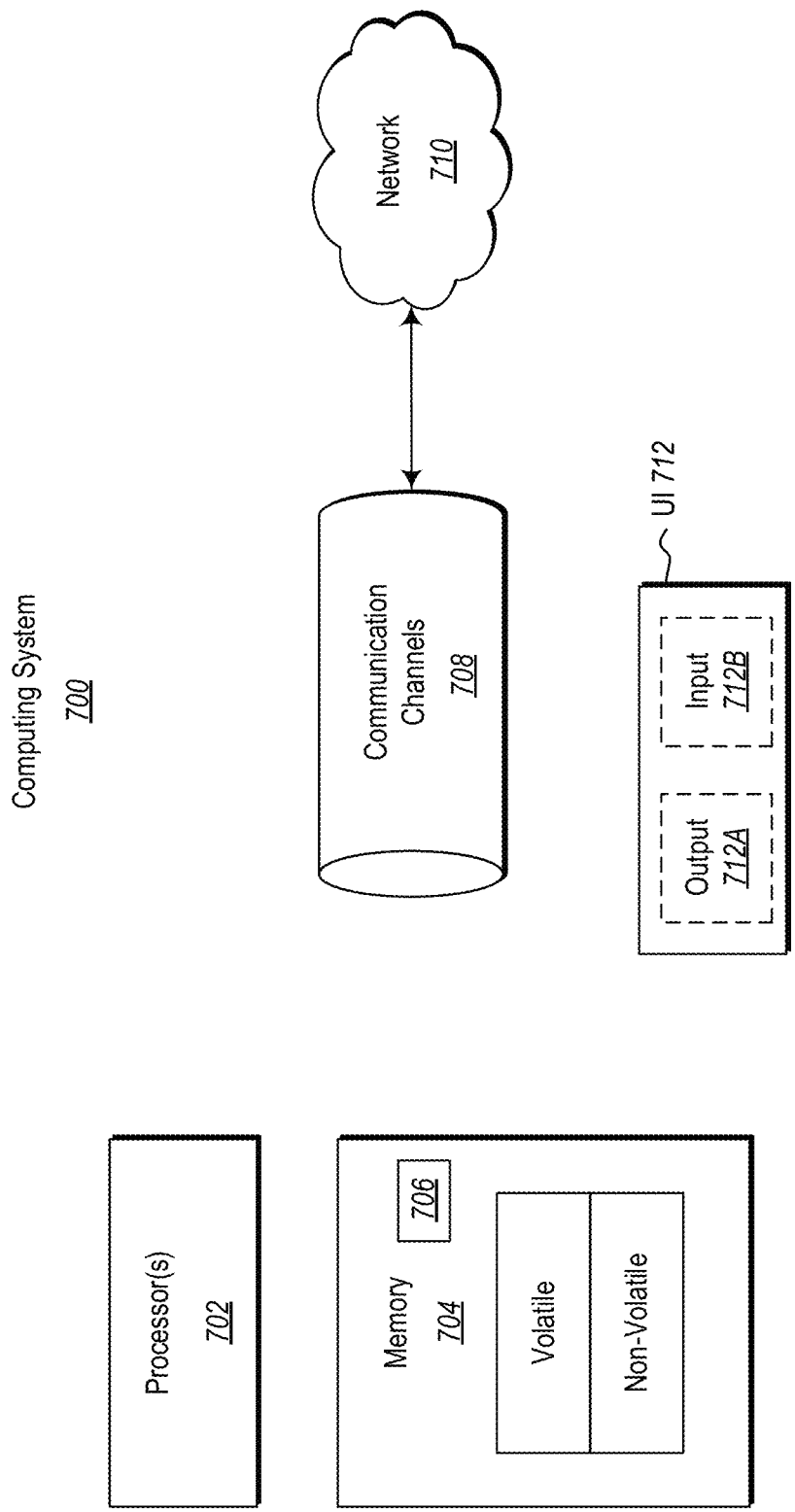
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors;
   one or more computer-readable media having thereon computer-executable instructions that are structured such so as to configure the computing system to perform the following:
   a version control system that permits each of multiple versions of code under development to be selected by a developer, the version control system further configured to count added portions of code from a further edited state of the code and a selected version of the code;
   a change estimation component configured to estimate a degree of change between the further edited state of the code and the selected version of the code, by being configured to:
      for each of one or more counted added portions counted by the version control system since the selected version by the version control system, estimating that the added portion complies with a non-review characteristic, the estimation of the degree of change being made by excluding at least the added portions that comply with the non-review characteristic; and
      causing a visualization of the estimated degree of change to be displayed in association with the further edited state of the code.

2. The computing system in accordance with claim 1, the computing system being a computing system used by a developer to select the selected version of the code, and to create the further edited state of the code from the selected version of the code.

3. The computing system in accordance with claim 2, the non-review characteristic being specified by the developer.

4. The computing system in accordance with claim 1, the computing system being a computing system used by a reviewer to review the further edited state of the code as a candidate next version of the code.

5. The computing system in accordance with claim 4, the non-review characteristic being specified by the reviewer.

6. The computing system in accordance with claim 1, the non-review characteristic being that the added portion is an automatically added portion.

7. The computing system in accordance with claim 1, the version control system configured to count added portions on a granularity of a line of code, such that the counted added portions are counted added lines.

8. The computing system in accordance with claim 7, the non-review characteristic being that the added line is a comment line.

9. The computing system in accordance with claim 7, the non-review characteristic being that the added line is a blank line.

10. The computing system in accordance with claim 7, the non-review characteristic being that the added line is caused by a strict splitting of a prior line into multiple lines.

11. The computing system in accordance with claim 7, the non-review characteristic being that the added line is syntactically identical to a deleted line at the same position.

12. The computing system in accordance with claim 1, the version control system configured to count added portions on a granularity of a word, such that the counted added portions are counted added words.

13. The computing system in accordance with claim 1, the estimating that the added portion complies with a non-review characteristic comprising estimating that the added portion complies with any one of a plurality of non-review characteristics, the estimation of the degree of change being made by excluding at least the added portions that comply with any of the non-review characteristics.

14. The computing system in accordance with claim 1, the version control system being further configured to count deleted portions of the code deleted since the selected version of the code to form the further edited state of the code, the change estimation component configured to estimate the degree of change between the further edited state of the code and the selected version of the code, by being configured to:
for each of one or more counted deleted portions counted by the version control system since the selected version by the version control system, estimating that the deleted portion complies with a non-review characteristic, the estimation of the degree of change being made by also excluding at least the deleted portions that comply with the non-review characteristic.

15. The computing system in accordance with claim 14, the version control system configured to count deleted portions on a granularity of a line of code, such that the counted deleted portions are counted deleted lines.

16. The computing system in accordance with claim 15, the non-review characteristic for a deleted line of code being that the deleted line is a comment line.

17. The computing system in accordance with claim 15, the non-review characteristic for a deleted line of code being that the deleted line is a blank line.

18. The computing system in accordance with claim 15, the non-review characteristic for a deleted line of code being a strict combination of multiple previous line of code.

19. A method for a computing system to estimate and visualize a degree of change between a further edited state of code and a selected version of the code in an environment in which a version control system permits each of multiple versions of code under development to be selected by a developer, the version control system further configured to count added portions of code from a further edited state of the code and the selected version of the code, the method comprising:
for each of one or more counted added portions counted by the version control system since the selected version by the version control system, estimating that the added portion complies with a non-review characteristic, the estimation of the degree of change being made by excluding at least the added portions that comply with the non-review characteristic; and
causing a visualization of the estimated degree of change to be displayed in association with the further edited state of the code.

20. A computing system comprising:
one or more processors;
one or more computer-readable media having thereon computer-executable instructions that are structured such so as to configure the developer computing system to perform the following:
a version control system that permits each of multiple versions of code under development to be selected by a developer, the version control system further configured to count added lines of code and deleted lines of code from a further edited state of the code and a selected version of the code;
a change estimation component configured to estimate a degree of change between the further edited state of the code and the selected version of the code, by being configured to:
for each of one or more counted added lines of code counted by the version control system since the selected version by the version control system, estimating that the added line complies with an added line non-review characteristic;
for each of one or more counted deleted lines of code counted by the version control system since the selected version by the version control system, estimating that the deleted line complies with deleted line non-review characteristic;
the estimation of the degree of change being made by excluding at least the added lines that comply with the added line non-review characteristic, and excluding at least the deleted lines that comply with the deleted line non-review characteristic; and
causing a visualization of the estimated degree of change to be displayed in association with the further edited state of the code.

* * * * *